(12) United States Patent
Okabayashi et al.

(10) Patent No.: US 6,505,309 B1
(45) Date of Patent: *Jan. 7, 2003

(54) PROCESSING UNIT AND METHOD OF DEBUGGING THE PROCESSING UNIT

(75) Inventors: Toru Okabayashi, Kawasaki (JP); Yasushi Nagano, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,401

(22) Filed: Mar. 19, 1999

(30) Foreign Application Priority Data

Sep. 21, 1998 (JP) .......................... 10-266636

(51) Int. Cl.[7] ................................ G06F 11/34
(52) U.S. Cl. ....................... 714/35; 714/30; 714/733; 712/227; 711/138
(58) Field of Search ..................... 714/35, 34, 38, 714/726, 30, 47, 25, 40, 744, 736, 733; 712/227; 711/113, 118, 123, 130, 135, 138

(56) References Cited

U.S. PATENT DOCUMENTS

| | | | |
|---|---|---|---|
| 5,053,949 A | * | 10/1991 | Allison et al. |
| 5,491,793 A | * | 2/1996 | Somasundaram et al. |
| 5,530,804 A | * | 6/1996 | Edgington et al. |
| 5,717,851 A | * | 2/1998 | Yishay et al. |
| 5,732,210 A | * | 3/1998 | Buzbee |
| 5,809,293 A | * | 9/1998 | Bridges et al. |
| 5,841,670 A | * | 11/1998 | Swoboda |
| 5,864,864 A | * | 1/1999 | Lerner ........................ 707/100 |
| 6,035,422 A | * | 3/2000 | Hohl et al. .................... 714/35 |
| 6,041,406 A | * | 3/2000 | Mann .......................... 714/34 |
| 6,052,774 A | * | 4/2000 | Segars et al. .................. 714/38 |
| 6,085,278 A | * | 7/2000 | Gates et al. ................. 710/263 |
| 6,094,708 A | * | 7/2000 | Hilla et al. .................. 711/122 |
| 6,205,560 B1 | * | 3/2001 | Hervin et al. .................. 714/34 |

FOREIGN PATENT DOCUMENTS

JP 7-44419 2/1995

* cited by examiner

*Primary Examiner*—Paul R. Myers
(74) *Attorney, Agent, or Firm*—Staas & Halsey LLP

(57) ABSTRACT

A processing unit has an operation unit and a cache memory, and further has a debug support unit and a non-cache control circuit. The debug support unit outputs a debug mode signal when an address of a program being currently executed and an optional address set for debugging coincide with each other, and the non-cache control circuit controls the operation of the cache memory via the debug mode signal and outputs the debug mode signal externally of the processing unit.

15 Claims, 5 Drawing Sheets

PROCESSING UNIT AND METHOD OF DEBUGGING THE PROCESSING UNIT

BACKGROUND OF THE INVENTION

1. Field of the Invention

The present invention relates to a microprocessor and a debugging method for a microprocessor and, more particularly, to a debugging technology for a microprocessor incorporating therein a cache memory.

2. Description of the Related Art

In recent years, in order to speed up memory accessing, a cache memory is usually provided in a microprocessor (processing unit). However, with such a microprocessor incorporating therein a cache memory, since no output can be obtained unless a memory access does not find a hit in the cache memory, it is difficult to trace a program to be debugged to thereby understand the program execution state.

Conventionally, in a case where a system using a microprocessor incorporating therein a cache memory is to be debugged, it is a normal practice to use a break function. A break function is a function to make the microprocessor execute a branch at an optional address of a program, and for instance, in Japanese Unexamined Patent Publication (Kokai) No. 7-44419 (JPP'419), a control signal for the cache memory is generated externally of the microprocessor, so that the cache memory is deactivated by this control signal to perform a debugging process.

In other words, this break function is configured so as to make the microprocessor execute a branch at an optional address of a program and prepare a program at a destination for such a branch to thereby confirm whether or not a predetermined processing is being carried out.

As is described above, in JPP'419, an instruction converting circuit is provided for converting an instruction to be read at a specific address by a break demand signal into a branch instruction, so that a breakpoint is set to provide the microprocessor with a memory workspace different from a user workspace. The contents thereof are compared with an address data output from the microprocessor, so as to output a break demand signal when they coincide with each other, to thereby make a background monitor portion function as a memory workspace for a microcomputer development supporting device when a break response signal and the address data are received.

In a technology disclosed in JPP'419, there is a drawback in that, although it can execute real-time debugging, the microprocessor itself cannot-make a judgment on the operation; a cache memory operation (operation in which a cache memory is used) or non-cache memory operation (operation in which a cache memory is not used) and the bus cycle are still unknown when an access is started. In general, a burst access is performed in a cache operation, while no burst access is carried out in a non-cache operation, and the bus cycles (timing at which the bus is used) of the respective operations are different.

SUMMARY OF THE INVENTION

An object of the present invention is to provide a microprocessor (processing unit) in which cache hits in debugging and normal operations are made identical to each other. In addition, another object of the present invention is to have an independent debugger by connecting a ROM emulator to a separate ROM socket, reduce the number of terminals of a ROM socket incorporating therein a debugger, and further dispose a debug routine on the same address.

According to the present invention, there is provided a processing unit, having an operation unit and a cache memory, comprising a debug support unit for outputting a debug mode signal indicating a debug mode when an address of a program being currently executed coincides with an optional address set for debugging; and a non-cache control circuit for controlling the operation of the cache memory via the debug mode signal, whereby the debug mode signal is output externally from the processing unit.

The non-cache control circuit may switch OFF the cache memory so as to make it hold data in the debugging mode, whereby the data so held in the cache memory may be used as they are when the debugging mode is switched to a normal mode. The debug mode signal may be defined at the same timing as that at which an address signal is changed or at a timing prior thereto. When an address signal is decoded externally to the processing unit, the debug mode signal may be involved in the decoding operation when it is asserted, whereby a user area and a debugger area of an external unit may be separated from each other.

The processing unit may further comprise a bus interface unfit having a decoding circuit wherein, when the decoding circuit decodes an address signal inside the processing unit, the decoding circuit may execute decoding, with the debug mode signal being involved when the debug mode signal is asserted, and generates a chip select signal for selection of a width for an external bus.

The processing unit may further comprise a memory management unit having an address converting circuit and a selector, wherein the address converting circuit may convert a logical address from the operation unit for supply to the selector; and the selector may be adapted to select the logical address from the operation unit and the address converted by the address converting circuit with. the debug mode signal for output wherein, when the selector decodes the address signal inside the processing unit, the selector may select the logical address from the operation unit and output the same as it is to thereby dispose a debug routine at the same address. The processing unit may further comprise a main memory that is managed by the memory management unit.

Further, according to the present invention, there is provided a method of debugging a processing unit having an operation unit and a cache-memory, comprising the steps of activating a debug mode and outputting a debug mode signal externally to the processing unit when an address set for debugging and an address of a program being currently executed coincide with each other; and switching OFF the caches memory so as to hold therein data through the activation of the debug mode, whereby the data so held in the cached memory is also used in a normal mode as they are when the debug mode is switched to the normal mode.

The debug mode signal may be defined at the same timing as that at which an address signal is changed or at a timing prior thereto. When the address signal is decoded externally to the processing unit, the debug mode signal may be involved in the decoding when it is asserted, whereby a user area and a debugger area of an external unit may be separated from each other. When the address signal is decoded internally by the processing unit, the de bug mode signal may be involved in the decoding when it is asserted, whereby a chip select signal may be generated for selection of a width for an external bus. When the address signal is decoded internally by the processing unit, the address signal may be separated from those whose addresses are to be converted using the debug mode signal so as for the debug routine to be disposed on the same address.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Figure 1:
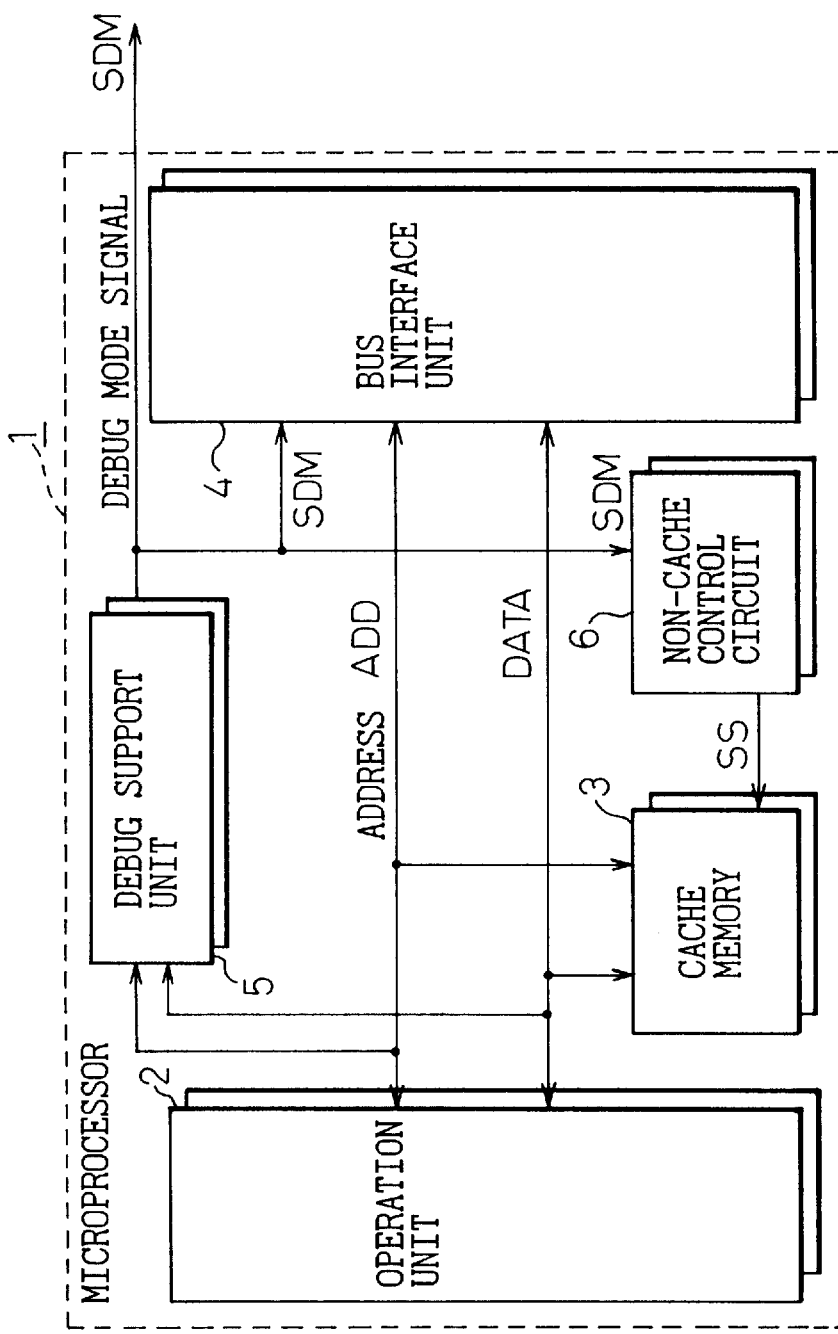
FIG. 1 is a block diagram showing, schematically, one embodiment of a microprocessor according to the present invention.

Referring to the drawings, embodiments of a microprocessor and a debugging method for a microprocessor according to the present invention will be described in detail below.

FIG. 1 is a block diagram showing schematically one embodiment of a microprocessor according to the present invention.

As shown in FIG. 1, a processing unit (microprocessor) 1 comprises an operation unit 2, a cache memory 3, a bus interface unit 4, a debug support unit 5 and a non-cache control circuit 6.

The operation unit 2 is a section where various kinds of operations are executed and constructed so as to exchange an address signal ADD and a data signal DATA with an external section of the microprocessor 1 via the bus interface unit 4 and an address signal ADD and a data signal DATA with the cache memory 3 provided inside the microprocessor 1.

The debug support unit 5 is constructed to set an optional address for debugging and to output a debug mode signal SDM showing a debug mode when an address of a program being currently executed coincides with an address set for debugging. This debug mode signal. SDM is arranged so as to be output as it is, while being supplied to the bus interface unit 4 and the non-cache control circuit 6.

In this embodiment, when a trap is generated while a user program is being executed, a break being accepted, a debug mode signal SDM is first output which indicates that a debug mode has been entered, and the signal is then input into the non-cache control circuit 6. Then, a control signal SS is sent from the non-cache control circuit 6 to the cache memory 3 to deactivate the cache memory 3 for a cacheable control in which a debug routine is prevented from entering the cache memory 3, whereby cache hits in debug and normal operations are made identical to each other.

Namely, it is configured that the non-cache control circuit 6 receives a debug mode signal SDM from the debug support unit 5 and, when in a debug mode, turns OFF the cache memory 3 so as to hold therein data, so that when the debug mode is switched to a normal mode the data held in the cache memory 3 can also be used in the normal mode as they are.

In addition, in this embodiment, as will be described later, the debug mode signal SDM intended exclusively to indicate the debug mode is output by the microprocessor as a decodable signal, and a debug process is designed to be performed with this debug mode signal SDM.

The debug mode signal SDM is adapted to be defined at the same timing as that at which an address signal ADD is changed or at a timing slightly prior thereto.

Figure 2:
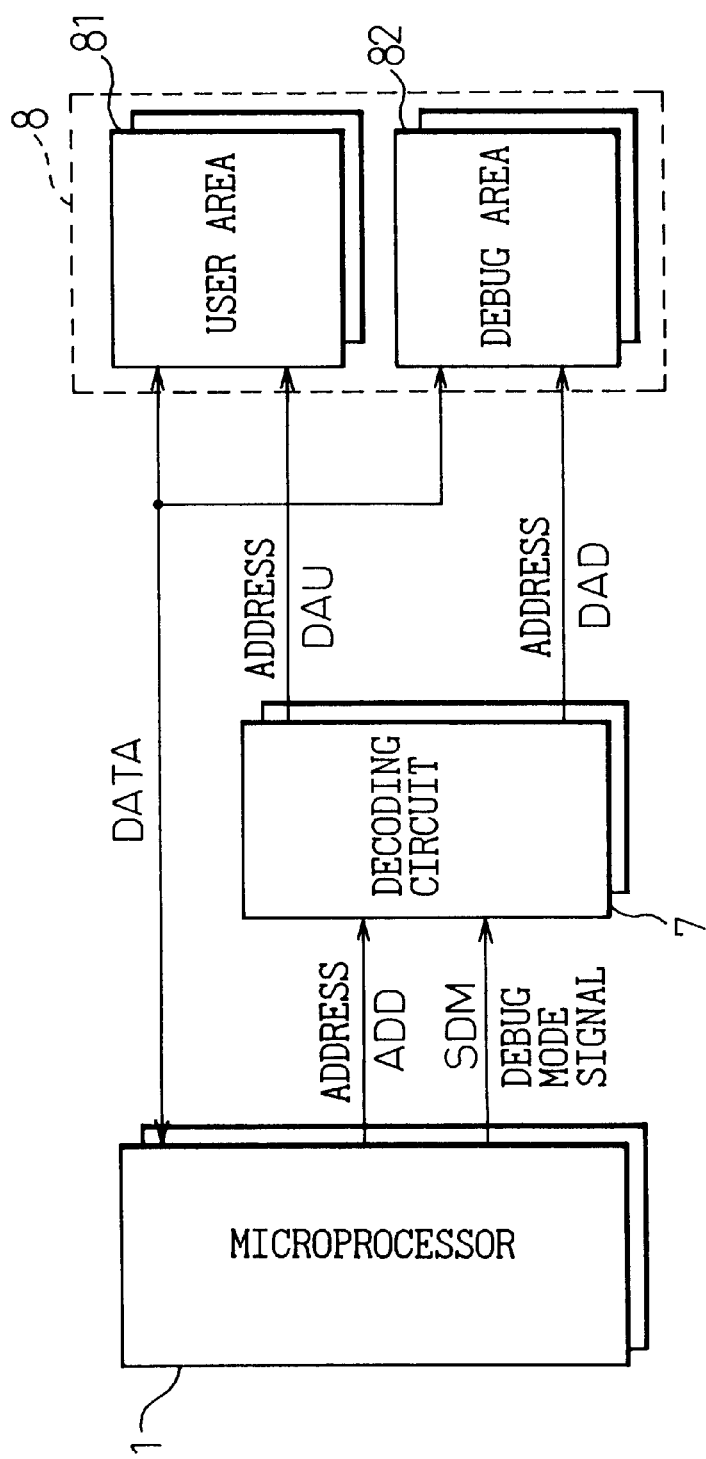
FIG. 2 is a block diagram explaining a debugging method using the microprocessor using the microprocessor shown in FIG. 1.

FIG. 2 is a block diagram explaining a debug method using the processing unit (microprocessor 1) shown in FIG. 1. In FIG. 2, reference numeral 7 denotes a decoding circuit and reference numeral 8 an external memory (external unit) having a user area 81 and a debug area 82.

As shown in FIG. 2, address signal ADD and debug signal SDM from the microprocessor 1 are supplied into the decoding circuit 7, where the address signal ADD and debug signal SDM are decoded, and an address decode output signal DAU for the user area and an address decode output signal DAD for the debug area are then output so as to access the user area 81 and the debug area 82, of the external memory 8, respectively. A data signal DATA is configured to be bus connected between the microprocessor 1 and the external memory 8 (user area 81 and debug area 82).

In other words, as shown in FIG. 2, in this embodiment, a debug signal which is asserted when an address signal ADD is decoded outside the microprocessor 1 is also decoded together, whereby the user area 81 and the debugger area 82, which are in the external memory 8, are selected and a debug routine is called out of the debugger area 82 for a debug process. This enables the user area 81 and the debugger area 82 to be separated from each other when, for instance, a ROM socket is used as an external memory 8, and a ROM emulator can be connected to the ROM socket so, separated so as to make the debugger independent.

Figure 3:
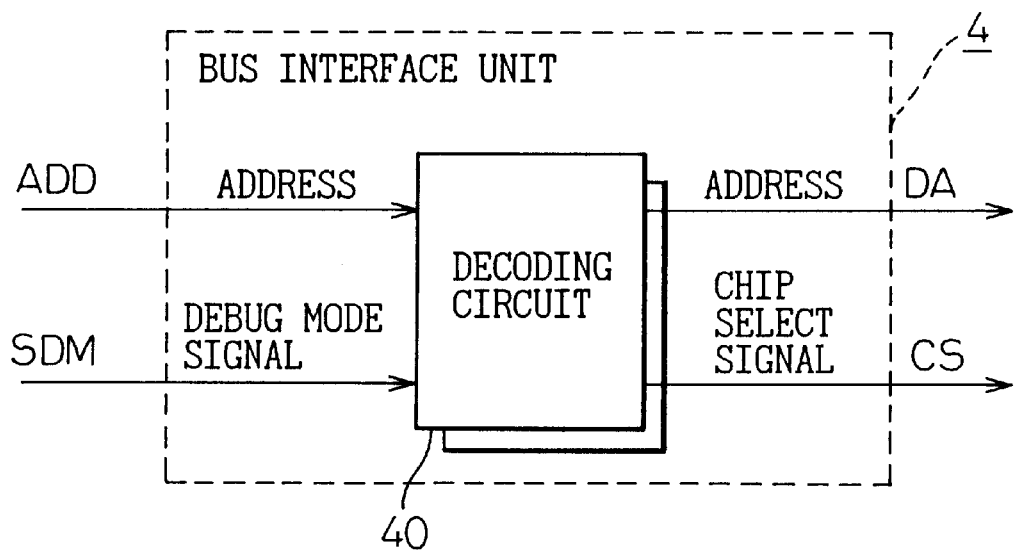
FIG. 3 is a block diagram showing one example of a bus interface unit in the microprocessor shown in FIG. 1 as another embodiment of the present invention.

FIG. 3 is a block diagram showing an example of the bus interface unit in the processing unit shown in FIG. 1, which is another embodiment of the present invention.

As shown in FIG. 3, the bus interface unit 4 has, for instance, a decoding circuit 40 for decoding an address signal ADD and a debug mode signal SDM when they are received at the bus interface unit 4, which thereafter outputs an address decode output signal DA and a chip select signal CS. In other words, in the embodiment as shown in FIG. 3, when the address signal ADD is decoded by the decoding circuit 40 provided inside the microprocessor 1, the debug mode signal SDM is also involved in such an address decoding, and a chip select signal CS is then generated so as to be judged for selection of the width of an external bus.

Thus, the number of terminals of a ROM socket for installation in the debugger can be reduced by providing the decoding circuit 40 in the bus interface unit 4 in the microprocessor 1 and executing an address decoding of signals including the debug mode signal SDM. for selection of the width of an external bus.

Figure 4:
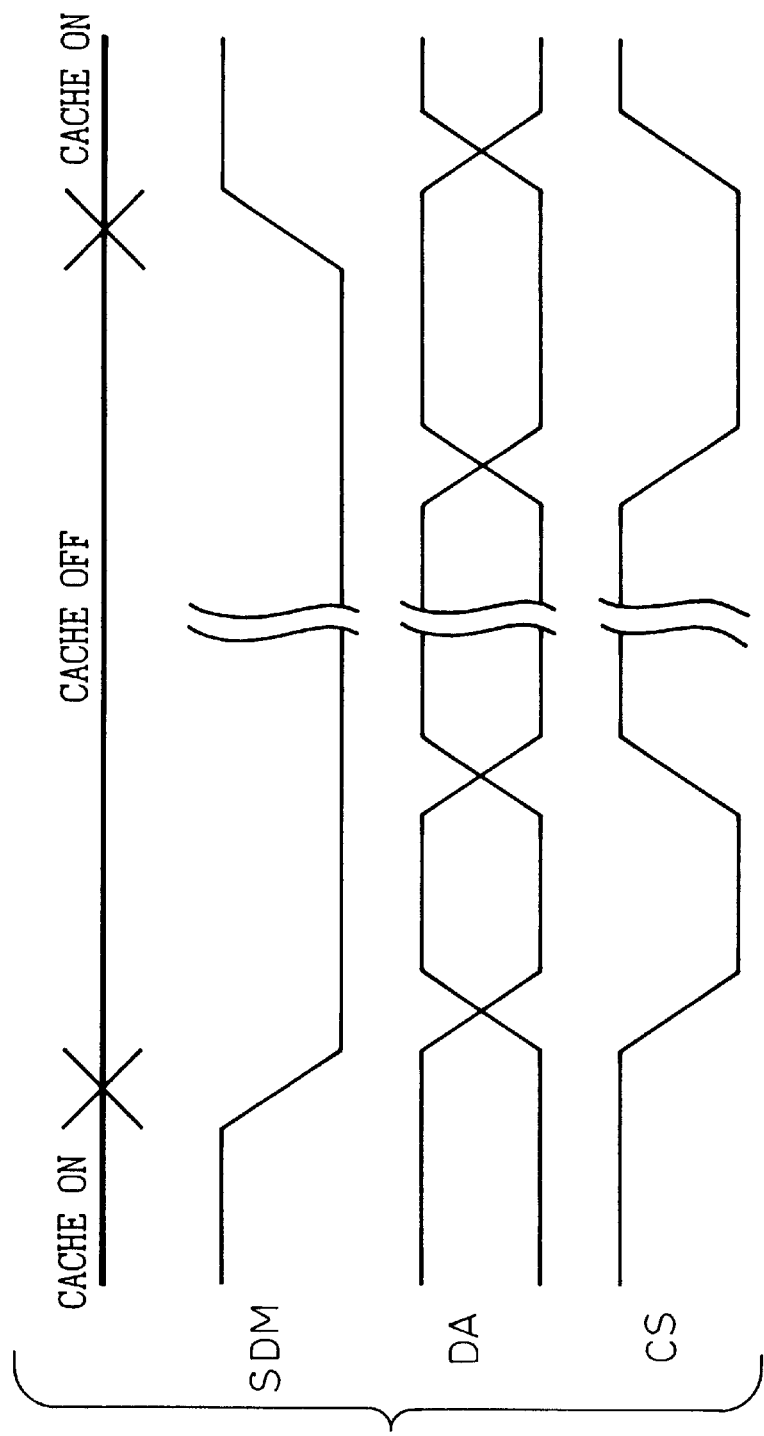
FIG. 4 is a timing diagram for explaining an operation of the bus interface unit shown in FIG. 3.

FIG. 4 is a timing diagram explaining the operation of the bus interface unit shown in FIG. 3.

As is described above, the debug mode signal SDM is adapted to be defined at the same timing at which the address signal ADD is changed or at a timing prior thereto. In FIG. 4, the debug mode signal is decoded by the decoding circuit 40 and is defined at a timing prior to a timing at which the slightly delayed address decode output signal DA and the chip select signal CS are changed (of course, at the same timing as that at which the address signal AD is changed or at a timing prior thereto) so that the ON/OFF control of the cache memory 3 is carried out.

Figure 5:
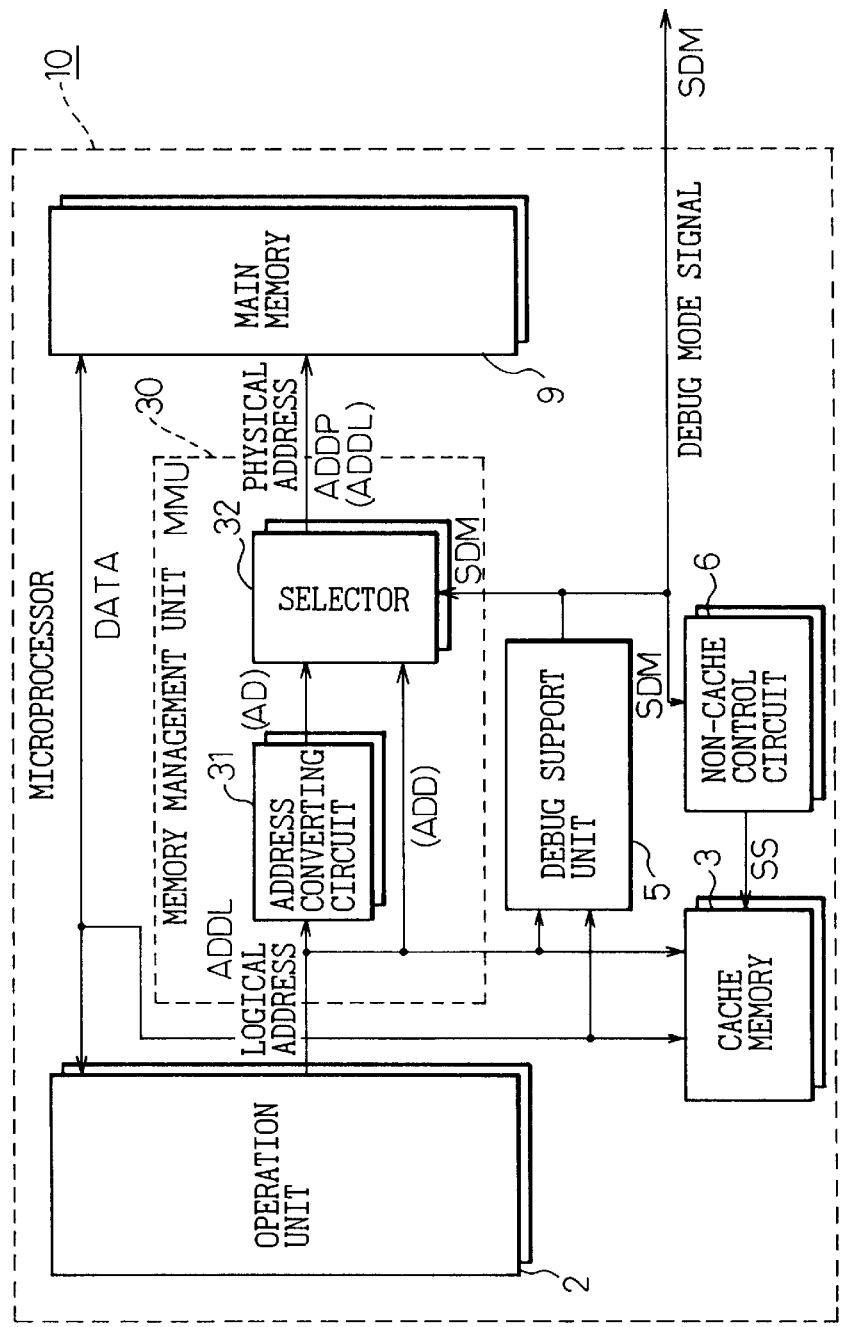
FIG. 5 is a block diagram schematically showing a further embodiment of the microprocessor according to the present invention.

FIG. 5 is a block diagram schematically showing a further embodiment of the processing unit according to the present invention.

As shown in FIG. 5, in this embodiment, provided in a microprocessor 10 are a main memory 9 and a memory management unit (MMU) 30. In this embodiment, the configuration and operation of the cache memory 3, the debug support unit 5 and the non-cache control circuit 6 are identical to those used in the embodiment shown in FIG. 1.

The memory management unit 30 has an address converting circuit 31 and a selector 32. The address converting circuit 31 converts (translates) a logical address (virtual address) ADDL (ADD) from the operation unit 2 and sends what has been converted there to the selector 32. The selector 32 selects the logical address from the operation unit 2 and the address decode output signal (AD) converted by the address converting circuit 31 using the debug mode signal SDM and outputs what is selected as a physical address ADDP. In FIG. 5, an address signal input from the main memory 9 into the operation unit 2 and its converting circuit are omitted.

Here, when the selector 32 decodes the address signal inside the microprocessor 10, it selects the logical address ADDL from the operation unit 2 when the debug mode signal. SDM is asserted, outputs it as a physical address ADDP and disposes the debug routine on the same address of the main memory 9. In other words, in the event that an address decoding is carried out inside the microprocessor 10, the debug mode signal SDM is separated from those whose addresses are to be converted (translated) by the memory management unit 30 when it is asserted, thereby making it possible to dispose the debug routine on the same address.

As has been described in detail, according to the present invention, since the debug routine is not allowed to enter the cache memory, cache hits in debugging and normal operations can be made identical. Furthermore, according to the present invention, the debugger can be made to be independent by connecting the separated ROM socket to the ROM emulator. Moreover, the number of terminals of the ROM socket installing therein a debugger can be reduced, and the debug routine can be disposed at the same address.

Many different embodiments of the present invention may be constructed without departing from the spirit and scope of the present invention, and it should be understood that the present invention is not limited to the specific embodiments described in this specification, except as defined in the appended claims.

What is claimed is:

1. A processing unit having an operation unit, comprising:
   a cache memory that holds a data when the cache memory is deactivated and allows the use of the data when the cache memory is not deactivated;
   a debug support unit that outputs a debug mode signal when an address of a command being executed coincides with an address set for debugging; and
   a non-cache control circuit that controls the operation of the cache memory via the debug mode signal, wherein the non-cache control circuit deactivates the cache memory when receiving the debug mode signal and does not deactivate the cache memory when not receiving the debug mode signal.

2. A processing unit as claimed in claim 1, wherein said debug .mode signal is defined at the same timing as that at which an address signal is changed or at a timing prior thereto.

3. A processing unit as claimed in claim 2, wherein when an external address is used by said processing unit, said debug mode signal is involved in determining the external address when it is determined, whereby a user area and a debugger area of an external memory are separated from each other.

4. A processing unit as claimed in claim 2, further comprising a bus interface unit having a decoding circuit, wherein when said decoding circuit decodes an address signal inside said processing unit, said decoding circuit executes a decoding with said debug mode signal being involved when said debug mode signal is asserted and generates a chip select signal for selection of a width for an external bus.

5. A processing unit as claimed in claim 2, further comprising a memory management unit having an address converting circuit and a selector, wherein:
   said address converting circuit converts a logical address from said operation unit for supply to said selector; and
   said selector is adapted to select the logical address from said operation unit and the address converted by said address converting circuit with said debug mode signal for output, wherein when said selector decodes said address signal inside said processing unit, said selector selects the logical address from said operation unit and outputs the same as it is to thereby dispose a debug routine on the same address.

6. A processing unit as claimed in claim 5, further comprising a main memory that is managed by said memory management unit.

7. A method of debugging a processing unit having an operation unit and a cache memory, comprising the steps of:
   activating a debug mode and outputting a debug mode signal from a debug support unit when an address set for debugging and an address of a command being currently executed coincide with each other; and
   deactivating the cache memory such that the cache memory holds therein data regardless of activation of the debug mode, whereby the data in the cache memory is used in a normal mode associated with other commands.

8. A method of debugging a processing unit as claimed in claim 7, wherein said debug mode signal is defined at the same timing as that at which an address signal is changed or at a timing prior thereto.

9. A method of debugging a processing unit as claimed in claim 8, wherein when said address signal is decoded externally of said processing unit, said debug mode signal is involved in the decoding when it is asserted, whereby a user area and a debugger area of an external unit are separated from each other.

10. A method of debugging a processing unit as claimed in claim 8, wherein when said address signal is decoded internally of said processing unit, said debug mode signal is involved in the decoding when it is asserted, whereby a chip select signal is generated for selection of a width for an external bus.

11. A method of debugging a processing unit as claimed in claim 8, wherein when said address signal is decoded internally by said processing unit, said address signal is separated from those whose addresses are to be converted using said debug mode signal so that the debug routine can be disposed at the same address.

12. A processing unit having a cache memory, comprising:
   a debug support section that outputs a debug mode signal when an address of a command being executed coincides with a predefined debugging address; and
   a non-cache control section that controls the operation of the cache memory according to the debug mode signal, wherein the non-cache control section deactivates the cache memory for the command with the predefined debugging address, and allows the cache memory to operate normally for other commands that coincide with other addresses.

13. The processing unit as claimed in claim 12, further comprising:

a memory management unit that converts addresses based upon a selection, wherein the memory management unit converts a logical address to the predefined debugging address when the selection is debug.

14. The processing unit as claimed in claim 13, further comprising:

a main memory, separate from the processing unit, that stores the program, debug information and a results of the program, wherein the main memory stores the program, debug information and the results of the program in the predefined debugging address and stores other information in a second area.

15. A processing unit as claimed in claim 1, wherein said non-cache control circuit deactivates said cache memory so as to make it hold data in said debugging mode, whereby the data so held in said cache memory is used as they are when said debugging mode is switched to a normal mode.

* * * * *